US008066101B2

(12) United States Patent
Yuasa et al.

(10) Patent No.: US 8,066,101 B2
(45) Date of Patent: Nov. 29, 2011

(54) BELT DEVICE FOR DRIVING ELEVATOR

(75) Inventors: Kazuyuki Yuasa, Yamatokohriyama (JP); Yasunori Ishikiriyama, Yamatokohriyama (JP); Atsuhito Wake, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 355 days.

(21) Appl. No.: 11/597,378

(22) PCT Filed: May 26, 2005

(86) PCT No.: PCT/JP2005/009634

§ 371 (c)(1),
(2), (4) Date: Nov. 22, 2006

(87) PCT Pub. No.: WO2005/115907

PCT Pub. Date: Dec. 8, 2005

(65) Prior Publication Data

US 2008/0105496 A1 May 8, 2008

(30) Foreign Application Priority Data

May 27, 2004 (JP) ................................ 2004-157169

(51) Int. Cl.
*B66B 11/08* (2006.01)
*F16G 1/00* (2006.01)

(52) U.S. Cl. ......................... 187/251; 474/237; 184/254

(58) Field of Classification Search .................. 474/237; 187/252, 254, 264, 265; 198/330, 335, 336; 226/170, 171; 254/333, 334, 335, 336

See application file for complete search history.

(56) References Cited

U.S. PATENT DOCUMENTS 4,553,951 A * 11/1985 Pavone ......................... 474/148
5,207,308 A * 5/1993 Sheffield et al. .............. 198/336
6,199,678 B1 * 3/2001 Reo .............................. 198/330
6,742,627 B2 * 6/2004 Drabot et al. ................ 187/254
(Continued)

FOREIGN PATENT DOCUMENTS

JP 02-123012 5/1990
(Continued)

OTHER PUBLICATIONS

Precision Polymer Engineering Ltd., Material Data Sheet C70M, Oct. 2003, Issue 2, Revision 3, 1.*

*Primary Examiner* — Michael Mansen
*Assistant Examiner* — Robert Reese
(74) *Attorney, Agent, or Firm* — Clark & Brody

(57) ABSTRACT

A belt device for driving an elevator is provided, the rest retaining capability of which is improved in order to retain the stopped state of an elevator cage if oil or water adheres to between a belt and a pulley. In the belt device for driving an elevator in which a belt 4 is stretched over a plurality of pulleys 1, 2, and 3, and the belt 4 is rotated by the rotations of the pulleys 1, 2, and 3, wherein the coefficient of friction of a contact surface with at least a driving pulley in the belt 4 is set to 0.6 to 3.0, and the contact surface is constructed of a rubber having a hardness (IRHD) of 65 to 95, and a wear resistance of 5 to 300 $mm^3$ in Taber wear (ISO547-1-1999, under conditions: a wear ring of H18; a load of 1 kg; and 1000 rpm).

7 Claims, 5 Drawing Sheets

U.S. PATENT DOCUMENTS

| | | | | |
|---|---|---|---|---|
| 6,983,826 | B2 * | 1/2006 | Wake et al. | 187/252 |
| 7,207,550 | B2 * | 4/2007 | Spiess et al. | 254/333 |
| 2003/0051948 | A1 * | 3/2003 | Drabot et al. | 187/254 |
| 2004/0045772 | A1 * | 3/2004 | Spiess et al. | 187/254 |
| 2004/0048708 | A1 * | 3/2004 | Nonnast et al. | 474/260 |
| 2006/0105873 | A1 * | 5/2006 | Sato et al. | 474/263 |

FOREIGN PATENT DOCUMENTS

| | | |
|---|---|---|
| JP | 2003-212456 | 7/2003 |
| JP | 2003-252554 | 9/2003 |
| JP | 2003-261280 | 9/2003 |
| WO | WO 02/064482 | 8/2002 |

* cited by examiner

[Fig. 1]
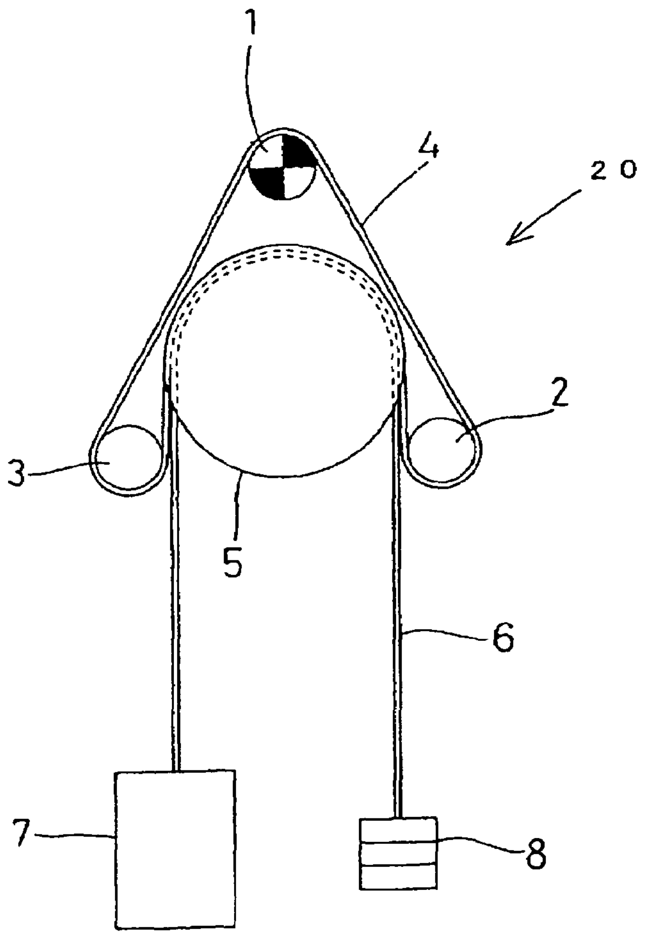
[Fig. 2]
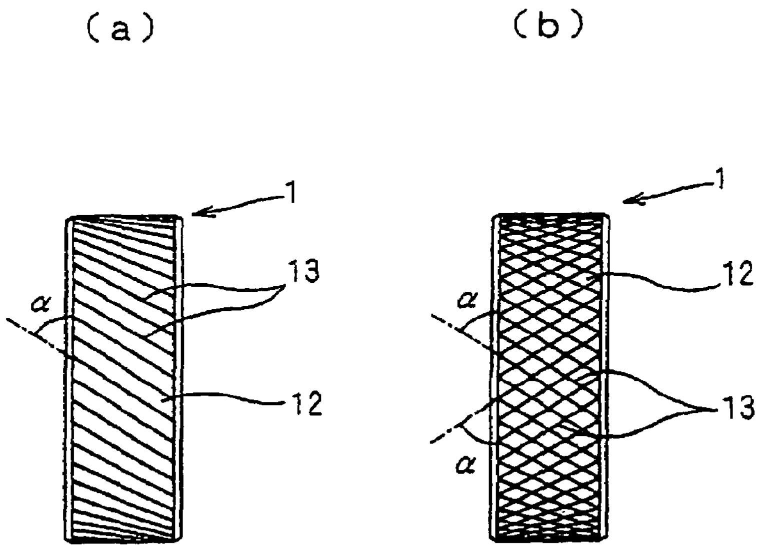

[Fig. 3]
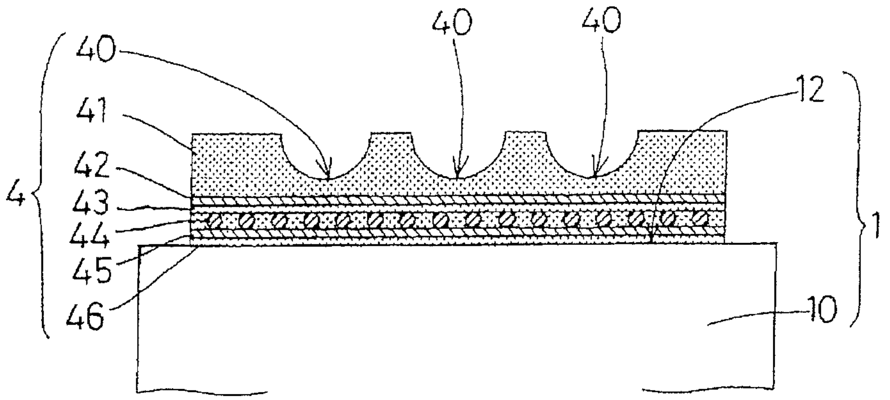
[Fig. 4]
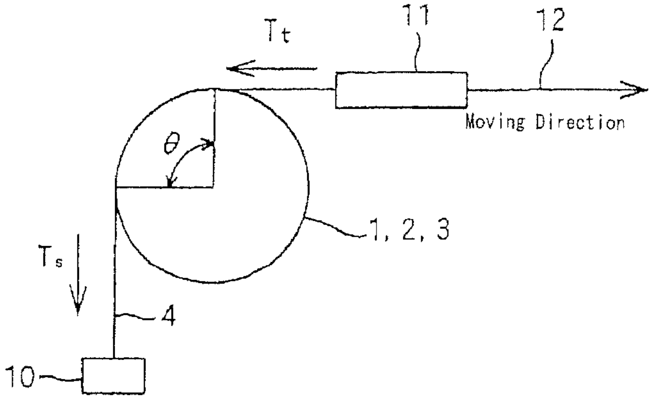
[Fig. 5]
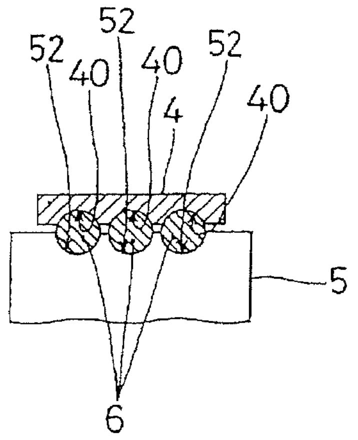

[Fig. 6]
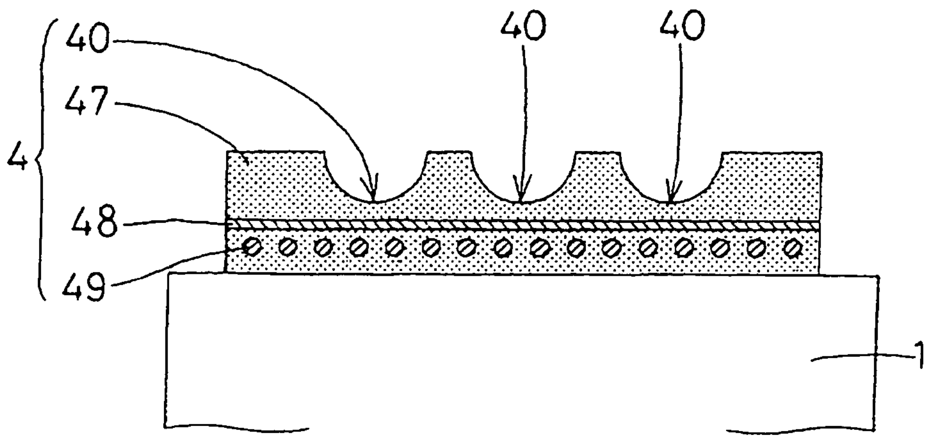
[Fig. 7]
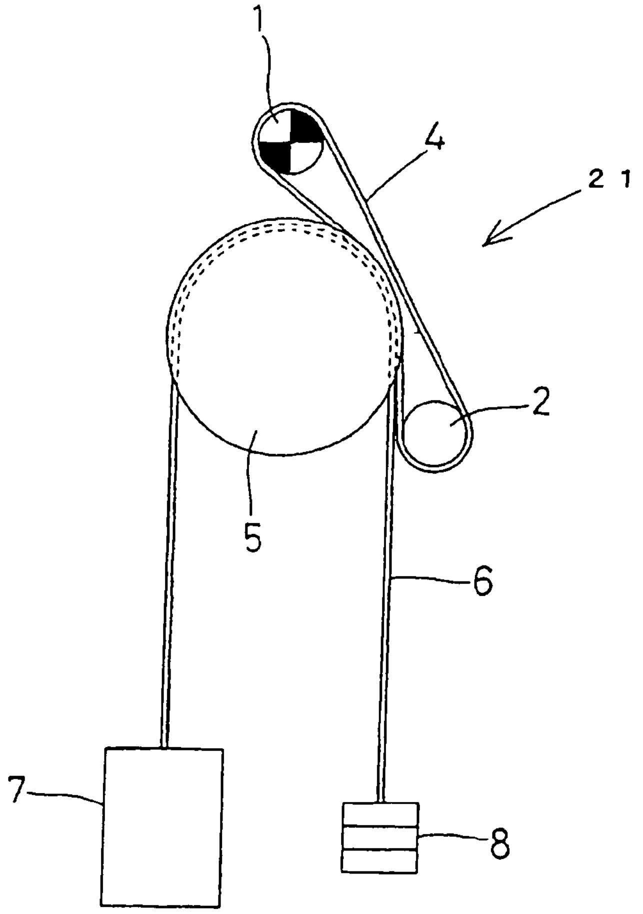

[Fig. 8]
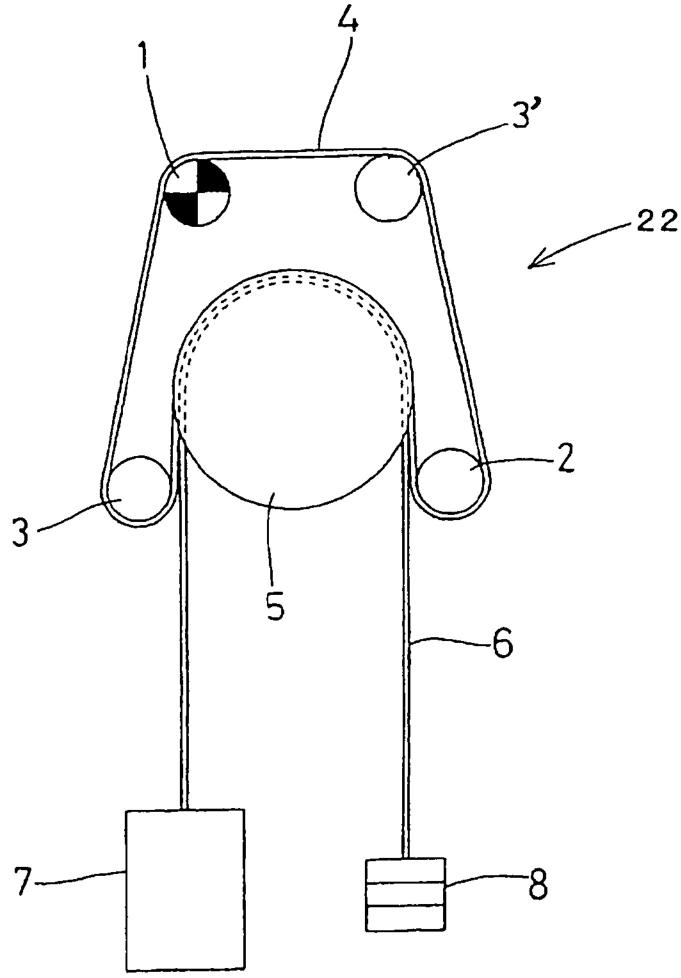
[Fig. 9]
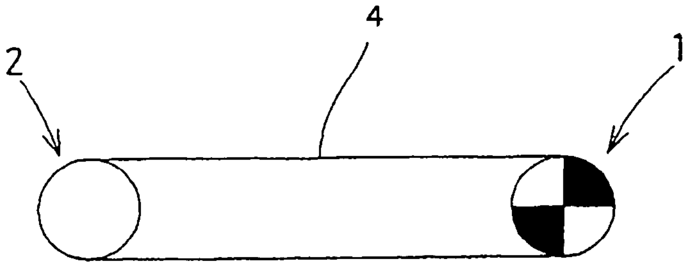

[Fig. 10]
Prior Art
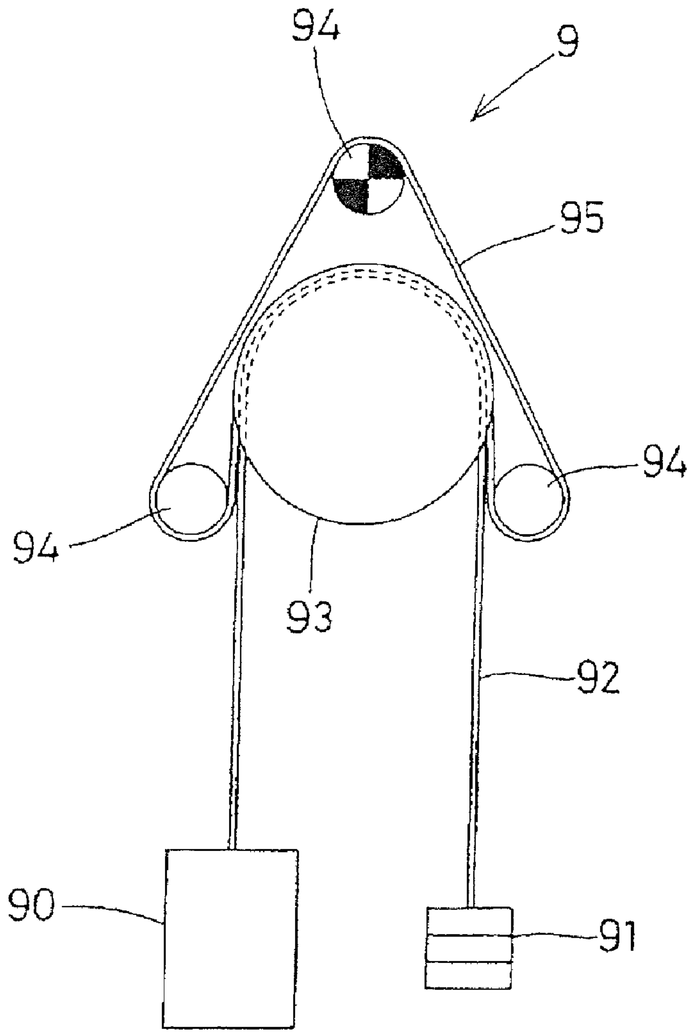

BELT DEVICE FOR DRIVING ELEVATOR

TECHNICAL FIELD

The present invention relates to a belt device for driving an elevator.

BACKGROUND ART

Recently, a device for driving an elevator with a new system has been developed, and its patent application has been filed (for example, refer to Japanese Patent Unexamined Publication No. 2003-252554).

Referring to FIG. 10, in this device 9 for driving an elevator, an elevator rope 92, one end of which is provided with an elevator cage 90 and the other end is provided with a balance weight 91, is entrained about a sheave 93, and the elevator cage 90 can be moved up and down by pressing a belt 95 for driving an elevator stretched over a plurality of flat pulleys 94, into contact with an arcuate region of an elevator rope 92 wound around the sheave 93, and allowing one of the plurality of flat pulleys 94 to be rotatably driven by a motor.

The device for driving an elevator with this system has the merit of employing a relatively small motor as the rotary driving source of the belt 95.

However, in the device 9 for driving an elevator, if oil or water adheres to the belt 95 or the flat pulleys 94 over which the belt 95 is stretched, the coefficient of friction between them is lowered, and hence the rest retaining capability thereof is lowered. When the rest retaining capability is extremely lowered, it is impossible to stop the rotation of the sheave 93. This results in a considerably unfavorable condition where the elevator cage cannot retain its stopped state.

DISCLOSURE OF THE INVENTION

It is an object of the present invention to provide a belt device for driving an elevator, the rest retaining capability of which is improved in order to retain the stopped state of an elevator cage if oil or water adheres to between a belt and pulleys.

The present invention is directed to a belt device for driving an elevator in which a belt is entrained about a plurality of pulleys and the belt is rotated by the rotations of the pulleys. The belt is set to 0.6 to 3.0 in coefficient of friction of a contact surface with at least a driving pulley, and the contact surface of the belt is constructed of a rubber having a hardness (IRHD) of 65 to 95, and a wear resistance of 5 to 300 $mm^3$ in Taber wear (ISO547-1-1999, test conditions: a wear ring of H18; a load of 1 kg; and 1000 rpm).

In the belt device for driving an elevator of the present invention, the coefficient of friction of the contact surface between the belt and the pulleys, and the hardness and the Taber wear of a rubber layer constituting the contact surface are set as described above. This enables to prevent the wear of the contact surface between the belt and the pulleys, and also improve the rest retaining capability between the belt and the pulleys. Consequently, the stopped state of the elevator cage can be retained if oil or water adheres to between the belt and the flat pulleys.

The pulleys consist of a driving pulley and driven pulleys. Preferably, the circumferential surface of at least the driving pulley is subjected to such a knurling process that its knurling notch is orthogonal or obliquely with respect to a circumferential direction thereof. Preferably, the module of the knurling notch formed by the knurling process is 0.2 to 0.5 mm. It is further preferable that the knurling notch is formed at an angle of 30° to 45° to the circumferential direction of the pulleys.

Thus, the knurling process of the circumferential surfaces of the pulleys enables the belt to grip the knurling notch carved in the pulleys, thereby improving the rest retaining capability. In addition, the rest retaining capability can also be improved because if oil or water adheres to the belt or pulleys, the oil and the water escape into knurling channels.

In the belt device for driving an elevator of the present invention, it is preferable that the rubber constituting the contact surface between the belt and the pulleys is one selected from chloroprene rubber, urethane rubber, nitrile rubber, butadiene rubber, ethylene-propylene-diene rubber, hydrogenated nitrile rubber, styrene-butadiene rubber, and natural rubber, or a rubber composing two or more of these.

EFFECT OF THE INVENTION

In accordance with the belt device for driving an elevator of the present invention, the improved rest retaining capability enables the stopped state of the elevator cage to be retained if oil or water adheres to between the belt and the pulleys.

BRIEF DESCRIPTION OF THE DRAWINGS

FIG. 1 is a conceptual illustration of a preferred embodiment of a device for driving an elevator of the present invention;

FIGS. 2A and 2B illustrate examples of knurling process formed on the circumferential surface of a driving pulley of the device for driving an elevator; FIG. 2A is a conceptual illustration of a knurling notch having a plain weave pattern; and FIG. 2B is a conceptual illustration of a knurling notch having a twilled weave pattern;

FIG. 3 is a sectional view showing the relationship between the pulleys and the belt of the device for driving an elevator;

FIG. 4 is an explanatory drawing showing a method of measuring a coefficient of friction;

FIG. 5 is a sectional view showing the relationship among pulleys, a sheave, and a belt of the device for driving an elevator;

FIG. 6 is a sectional view showing a belt according to other preferred embodiment of the present invention;

FIG. 7 is a conceptual illustration showing the state of entraining a belt according to other preferred embodiment of the present invention;

FIG. 8 is a conceptual illustration showing the state of entraining a belt according to a still other preferred embodiment of the present invention;

FIG. 9 is a conceptual illustration of a device to be used for measuring the amount of wear in the reverse of a belt; and FIG. 10 is a conceptual illustration of a conventional device for driving an elevator.

DESCRIPTION OF REFERENCE NUMERALS

1: Driving pulley
2: Driven pulley
3: Driven pulley
4: Belt
5: Sheave
6: Elevator rope
7: Elevator cage
8: Balance weight
10: Pulley body
12: Circumferential surface
13: Knurling notch

PREFERRED MODE FOR CARRYING OUT THE INVENTION

A preferred embodiment of a belt device for driving an elevator of the present invention will be described below in detail with reference to FIGS. 1 to 5.

Referring to FIG. 1, in a device 20 for driving an elevator, an elevator rope 6, one end of which is provided with an elevator cage 7 and the other end is provided with a balance weight 8, is entrained about a sheave 5, and the elevator cage 7 can be moved up and down by pressing a belt 4 stretched over a driving pulley 1 and driven pulleys 2 and 3, into contact with an arcuate region of an elevator rope 6 wound around the sheave 5, and allowing the driving pulley 1 to be rotatably driven by a motor.

Referring to FIGS. 2A and 2B, in the driving pulley 1, a knurling notch 13 is formed on a circumferential surface 12 of a pulley body 10. The knurling notch 13 is carved so as to tilt obliquely (for example, an angle α in FIGS. 2A and 2B is 30° to 45°) with respect to the circumferential direction of the circumferential surface 12 of the pulley body 10. The module of the knurling notch 13 is 0.2 mm to 1.0 mm, and preferably 0.3 mm to 0.5 mm. The module can be found from the equation: m=t/π wherein m is a module; t is a pitch of the knurling notch 13; and π is the ratio of the circumference of a circle to its diameter (JIS B 0951). In general, the module indicates the dimension of a pitch, and the pitch increases as the module value increases. The knurling notch 13 may be orthogonal to the circumferential direction and, in general, a may be in the range of 30° to 90°. In the knurling notch 13 of the twilled weave pattern as shown in FIG. 2B, α is less than 90°.

Although the driven pulleys 2 and 3 are the same as the driving pulley 1, they may be different from the driving pulley 1 in diameter, width, and the like. The driven pulleys 2 and 3 may be subjected to knurling process similar to that to the driving pulley 1, or may not be subjected to knurling process.

The belt 4 is set to 0.6 to 3.0 in the coefficient of friction of a contact surface with the driving pulley 1 (corresponding to the reverse of the belt 4). The belt 4 is also set to 0.4 to 3.0 in the coefficient of friction of contact surfaces with the driven pulleys 2 and 3, respectively. The contact surface of the belt 4 is constructed of a rubber material having a hardness (International Rubber Hardness Degree (IRHD)) of 65 to 95, and a wear resistance of 5 to 300 $mm^3$ in Taber wear.

The Taber wear was measured by rotating a wear ring of H18 under a load of 1 kg and 1000 rpm, according to the prescription under ISO547-1-1999. As used herein, the wear ring of "H18" is a symbol indicating a wear ring prescribed under JIS K 6264 (ISO547-1-1999).

The belt 4 is an endless one obtained by laminating and integrating a rubber layer 41 made of chloroprene, a canvas (web) 42 made of polyamide, a thin rubber layer 43 made of chloroprene, a code buried layer 44 in which an aramid code is buried in a rubber layer made of chloroprene, a canvas (web) 45 made of polyamide, and a thin rubber layer 46 made of chloroprene. A plurality of circumferential channels 40, in which the elevator rope 6 engages, are formed in a surface opposed to or contacted with the sheave 5.

As the materials of the rubber layers 41, 43, and 46, there can be used, besides the above-mentioned chloroprene rubber, one selected from urethane rubber (for example, mirable urethane rubber), nitrile rubber, polybutadiene rubber, ethylene-propylene-diene rubber (EPDM), hydrogenated nitrile rubber (H-NBR), styrene-butadiene rubber (SBR), and natural rubber, or a rubber composing two or more of these. At least only a portion of the rubber layer 4 which forms a contact surface with the driving pulley 1 and the driven pulleys 2 and 3, respectively, namely only the rubber layer 46 can be constructed of the above-mentioned rubber material. As used herein, the rubber composing two or more of these means a mixed or laminated rubber.

In order to set the coefficient of friction of the contact surface between the belt 4 and the driving pulley 1 to 0.6 to 3.0, for example, the number, the depth, the angle (α), and the like of the knurling notch may be adjusted. In order to adjust the coefficient of friction of the contact surface between the belt 4 and the driven pulleys 2 and 3 each not being subjected to the knurling process, for example, the material of the pulley surface (e.g., urethane resin or the like), its surface roughness, and the like may be changed.

The coefficient of friction can be measured by so-called belt movement method or pulley rotation method. In the belt moving method, as shown in FIG. 4, the pulley 1, 2, or 3 is fixed without rotation, and the coefficient of friction is found from the following equation, based on a tension Ts (Tension of slack side) due to a weight 10 attached to one end of the belt 4 entrained about the pulley, and a tension Tt (Tension of tight side) to be indicated on a load cell 11 when the belt 4 is moved in the direction as indicated by the arrow 12. Preferably, the travel speed of the belt 4 is about 30 mm/second.

$$\mu = \frac{1n(Tt/Ts)}{\theta}$$

wherein Tt is a tensile force (N) measured on the load cell 11; Ts is a tensile force (N) due to the weight attached to one end of the belt 4; μ is an apparent coefficient of friction between the belt and the pulley; and θ is an angle of contact (rad) between the belt and the pulley.

In the pulley rotation method, a coefficient of friction is found in the same manner as in the belt movement method, except that the pulley is rotated.

Preferably, a plurality of circumferential channels, in which the elevator rope 6 engages, are provided along the circumferential surface of the sheave 5. In the present embodiment, the circumferential surface of the sheave 5 is provided with three circumferential channels 52, in which the elevator rope 6 engages, as shown in FIG. 5.

Other Preferred Embodiments

The above-mentioned belt 4 may be constructed by burying a canvas (web) made of resin and a plurality of resin codes into a flat rubber member having a plurality of circumferential channels on the external side thereof. FIG. 6 shows a belt 4 constructed by burying a canvas (web) 48 made of resin and a plurality of resin codes 49 into a flat rubber member 47 having three circumferential channels 40 on the external side thereof.

FIGS. 7 and 8 show other preferred embodiments of the present invention. In a device 21 for driving an elevator as shown in FIG. 7, a belt 4 stretched only over a driving pulley 1 and a driven pulley 2 is pressed into contact with an arcuate region of an elevator rope 6 wound around a sheave 5. Like the device 21 for driving an elevator, the device may have a region to be pressed into contact, which is different from that in the above-mentioned device 20 for driving an elevator.

In a device 22 for driving an elevator as shown in FIG. 8, a belt 4 stretched over a driving pulley 1 and driven pulleys 2, 3, 3' is pressed into contact with an arcuate region of an elevator rope 6 wound around a sheave 5. The present invention may employ this embodiment.

Although the present invention will be described in more detail with reference to an example and a comparative example, the present invention is not limited to the following examples.

EXAMPLE 1

(Rest Retaining Capability)

A small device for test similar to the device 20 for driving an elevator as shown in FIG. 1 was manufactured. Its rest retaining capability test was conducted with the driving pulley 1 held stationary. The representations of the individual parts remain unchanged.

A driving pulley 1 used in the test was subjected to knurling process so as to have a knurling notch whose inclination α with respect to its circumferential direction was 40°, and had a module of 0.3 mm. Driven pulleys 2 and 3 were the same as the driving pulley 1, except that their respective circumferential surfaces were not subjected to knurling process.

A belt 4 used in the test was one obtained by laminating and integrating a rubber layer 41 made of chloroprene, a canvas (web) 42 made of polyamide, a thin rubber layer 43 made of chloroprene, a code buried layer 44 in which an aramid code is buried in a rubber layer made of chloroprene, a canvas (web) 45 made of polyamide, and a thin rubber layer 46 made of chloroprene. A plurality of circumferential channels 40, in which an elevator rope 6 engages, were formed in a surface opposed to or contacted with a sheave 5.

The coefficient of friction of a contact surface with the pulley 1 in the belt 4 was measured by the above-mentioned belt movement method. As the result, the coefficient of friction of the contact surface was 2.6. The IRHD of the rubber forming the contact surface was 90, and its Taber wear measured under the above-mentioned condition was 15.4 $mm^3$.

With the driving pulley 1 held stationary so as not to be rotatable, the rest retaining capability test was conducted by a method as described in the following items (1) to (3).

(1) The driving pulley was fixed, and the elevator rope 6 was subjected to an unbalanced load by changing a balanced weight 8;

(2) The elevator rope 6 was, as shown in FIG. 4, narrowed by the surfaces of the sheave 5 and the belt 4, and it transmitted the unbalanced load to the surface of the belt 4 under pressure. At this time, there occurred no slip between the surface of the elevator rope 6 and the surface of the belt 4.

(3) The force of the unbalanced load transmitted to the belt 4 became the force under which the belt 4 was rotated in a clockwise direction. At this moment, the mutual slip between the only fixed driving pulley 1 and the belt 4 was observed.

The above-mentioned test was conducted respectively under the condition that neither oil nor water adhered to the circumferential surface 12 of the driving pulley 1, and under the condition that oil was applied to the circumferential surface 12 of the driving pulley by using a waste.

COMPARATIVE EXAMPLE 1

The rest retaining capability test was conducted in the same manner as in Example 1, except that a flat pulley not subjected to knurling process was used as the conventional driving pulley 94. The coefficient of friction of the contact surface with the flat pulley 94 in the belt was 1.2. The test results of Example 1 and Comparative Example 1 are presented in Table 1 and Table 2.

TABLE 1

| | Unbalanced Load (kg) | | | |
|---|---|---|---|---|
| | 100 | 200 | 300 | 500 |
| Comparative Example 1 | rest | rest | slip | slip |
| Example 1 | rest | rest | rest | rest |

TABLE 2

| | Unbalanced Load (kg) | | | |
|---|---|---|---|---|
| | 100 | 200 | 300 | 500 |
| Comp. Ex. 1 (with oil) | rest | slip | slip | slip |
| Example 1 (with oil) | rest | rest | rest | slip |

As apparent from Table 1 and Table 2, the driving pulley 1 is extremely superior to the flat pulley as the conventional driving pulley, in rest retaining capability in the absence of oil and water, and in the presence of oil.

EXAMPLE 2

(Amount of Wear in the Reverse of the Belt)

As shown in FIG. 9, the belt 4 was stretched between the driving pulley 1 and the driven pulley 2 under load, and the driving pulley 1 was rotated. The used driving pulley 1 and the used belt 4 were the same as those in Example 1. The driven pulley 2 was the same as the driving pulley 1, except that the circumferential surface thereof was not subjected to knurling process.

The weight before rotating the driving pulley 1 and the weight after rotating it were measured, and the amount of wear in the reverse of the belt was found from a different between the two weights.

COMPARATIVE EXAMPLE 2

In the same manner as in Example 2, as shown in FIG. 9, a conventional rubber-immersed web surface type belt, whose rubber-immersed web surface functioned as a contact surface with the pulley, was stretched between the driving pulley 1 and the driven pulley 2 under load, and the driving pulley 1 was then rotated. The rubber-immersed web surface of this belt was 80 in IRHD, and its Taber wear measured under the above-mentioned condition was about 25.0 $mm^3$.

TABLE 3

| | Amount of Wear (mg) |
|---|---|
| Comparative Example 2 | 110 |
| Example 2 | 23 |

It will be seen from Table 3 that the belt 4 of Example 2 has an extremely small amount of wear than the rubber-immersed web surface type belt of Comparative Example 2.

The invention claimed is:

1. A belt device for driving an elevator in which an elevator rope, one end of which is provided with an elevator cage and the other end is provided with a balance weight, is entrained about a sheave, and the elevator cage can be moved up and down by pressing a reverse surface of a belt stretched over a plurality of pulleys including a driving pulley into contact with the elevator rope in an arcuate region of the elevator rope wound around the sheave, and allowing the driving pulley to be rotatably driven, and a plurality of circumferential channels (40, 52), in which the elevator rope (6) engages, are formed respectively in the circumferential surface of the sheave (5) and the reverse surface of the belt (4), and the reverse surface of the belt (4) is pressed directly into contact with the elevator rope (6) only, without being in contact with the surface of the sheave (5), and the belt is set to be 0.6 to 3.0 in coefficient of friction of a contact surface with at least the driving pulley, and the contact surface is constructed of a rubber having a hardness (IRHD) of 65 to 95, and a wear resistance of 5 to 300 $mm^3$ in Taber wear (ISO5470-1-1999, under conditions: a wear ring of H18; a load of 1 kg; and 1000 rpm).

2. The belt device for driving an elevator according to claim 1 wherein a rubber constituting a contact surface with a pulley in the belt is one selected from chloroprene rubber, urethane rubber, nitrile rubber, butadiene rubber, ethylene-propylene-diene rubber, hydrogenated nitrile rubber, styrene-butadiene rubber, and natural rubber, or a rubber composing two or more of these.

3. The belt device for driving an elevator according to claim 1 wherein the plurality of pulleys consists of a driving pulley and driven pulleys, and a circumferential surface of at least the driving pulley is subjected to such a knurling process that its knurling notch is orthogonal or obliquely with respect to a circumferential direction of the driving pulley.

4. The belt device for driving an elevator according to claim 3, wherein the belt is set to 0.4 to 3.0 in coefficient of friction of a contact surface with the driven pulleys.

5. The belt device for driving an elevator according to claim 3, wherein the knurling notch has a module of 0.2 to 0.5 mm.

6. The belt device for driving an elevator according to claim 1, wherein a knurling notch has an angle of 30° to 45° to a circumferential direction.

7. The belt device for driving an elevator according to claim 1 wherein the plurality of pulleys includes a driving pulley and two or three driven pulleys, and the driving pulley is positioned away from an arcuate region of an elevator rope wound around the sheave through driven pulleys.

* * * * *